US007249678B2

(12) United States Patent
Schieleit

(10) Patent No.: US 7,249,678 B2
(45) Date of Patent: Jul. 31, 2007

(54) SORTING APPARATUS

(75) Inventor: Jürgen Schieleit, Bargteheide (DE)

(73) Assignee: Otto (GmbH & Co KG), Hamburg (DE)

( * ) Notice: Subject to any disclaimer, the term of this patent is extended or adjusted under 35 U.S.C. 154(b) by 352 days.

(21) Appl. No.: 10/365,974

(22) Filed: Feb. 13, 2003

(65) Prior Publication Data

US 2004/0016679 A1 Jan. 29, 2004

(30) Foreign Application Priority Data

Feb. 13, 2002 (DE) .......................... 202 02 216 U

(51) Int. Cl.
*B65G 1/00* (2006.01)

(52) U.S. Cl. ....................... 209/655; 209/922; 414/278

(58) Field of Classification Search ................ 414/276, 414/278, 285; 198/435, 436; 209/655, 922–925
See application file for complete search history.

(56) References Cited

U.S. PATENT DOCUMENTS 2,127,278 A * 8/1938 Welch ....................... 414/280
3,077,271 A * 2/1963 Siempelkamp .............. 414/267
3,403,799 A * 10/1968 Sindzinski et al. ......... 414/564
3,565,725 A * 2/1971 Siempelkamp .............. 414/278
3,824,058 A * 7/1974 Axer et al. ................. 425/338
3,993,423 A * 11/1976 Stettes et al. ............... 425/339
4,065,003 A * 12/1977 Hostettler ................... 414/277
4,867,299 A * 9/1989 Fukuoka et al. ............ 198/435
5,362,197 A * 11/1994 Rigling ...................... 414/807
5,441,141 A * 8/1995 Bonnet .................. 198/370.03
6,478,137 B2 * 11/2002 Hebels et al. ............ 198/347.1
6,681,916 B2 * 1/2004 Hiroki ..................... 198/347.1
2003/0185656 A1 * 10/2003 Hansl ......................... 414/277

* cited by examiner

*Primary Examiner*—Joseph C. Rodriguez
(74) *Attorney, Agent, or Firm*—White & Case LLP

(57) ABSTRACT

A sorting apparatus has at least two sorter cells arranged substantially one above the other. Sorter cells are fitted to a driving unit for moving the sorter cells from a horizontal loading plane to a horizontal discharge plane, both of which are assigned to the sorter cells. A vertical distance between the sorter cells is equal to the vertical distance between two loading planes arranged one above the other and to the vertical distance between the upper and lower plane of at least a first and a second pair of discharge planes arranged one above the other.

13 Claims, 3 Drawing Sheets

SORTING APPARATUS

FIELD OF INVENTION

The present invention relates to a sorting apparatus having at least two sorter cells arranged substantially one above the other, in each case to pick up a product to be sorted, a horizontal loading plane assigned to the sorter cell and having a driving unit to which the sorter cells are fitted for moving the sorter cells from the respective loading plane to a horizontal discharge plane assigned to the sorter cell.

BACKGROUND OF INVENTION

In order to carry out sorting tasks, in particular in trade and industry, sorting apparatuses, also called sorters, are known that, in a controlled manner, transport a product to be sorted from a loading plane to a specific discharge plane. For this purpose, the sorters generally have units that operate as a driving unit in a guide system, for example a rail system. In order to pick up a product to be sorted, a sorter cell, for example a tilt tray, or a conveyor belt running horizontally, known as a transverse belt, is fitted to the driving unit. In order to transport a plurality of items of products to be sorted using one driving unit, high-performance sorting systems are known in which a plurality of sorter cells are arranged one above another on one driving unit. The vertical distance between two cells located one above the other then substantially corresponds to the vertical distance and the level of the loading apparatuses and the sorting destinations. Such sorting destinations are, for example, planes in a rack system, into which the product to be sorted is intended to be classified. For instance, in the case of the known high-performance sorting systems having, for example, three sorter cells arranged one above another, the loading of a driving unit takes place in three planes, and the items of product to be sorted are then also discharged to the sorting destinations in these three planes. In this case, loading plane and discharge plane are, in each case, permanently assigned to one another.

Sorting apparatuses are also known that have the possibility of changing level. Here, a driving unit picks up an item of product to be sorted in one plane and can discharge it in a number of planes by means of an appropriate lifting mechanism, which can be moved, in a controlled manner, to various levels. In this case, the more discharge levels that can be driven to, the more sorting destinations that can be reached by such a known apparatus, but also the higher the technical expenditure for this level change, both with regard to the control, as well as with regard to the kinematics, of the apparatus.

SUMMARY OF INVENTION

In contrast, the invention is based on the object of providing a sorting apparatus which, by means of a simple construction, permits the distribution of products to be sorted to a plurality of levels.

According to the invention, this object is achieved by a sorting apparatus having the features of claim 1. Preferred refinements are specified in the subclaims.

A sorting apparatus according to the invention has at least two sorter cells that are arranged substantially one above the other and can each pick up at least one item of products to be sorted from a loading apparatus. Furthermore, the sorting apparatus according to the invention has a driving unit, to which its sorter cells are fitted and that can move the sorter cells from the respective loading apparatus to a discharge plane. According to the invention, the vertical distance between two sorter cells arranged one above the other is now equal to the vertical distance between two loading planes arranged one above the other and equal to the vertical distance between the upper and the lower plane of at least a first and a second pair of discharge planes arranged one above the other, and the two sorter cells spaced apart in this way may be moved jointly from the level of one pair of planes to the level of another pair of planes at the vertical distance, which remains constant in the process.

Thus, depending on the number of pairs of planes arranged one above the other, the sorter cells arranged one above the other are able to distribute their transported items of product to be sorted to just as many sorting destination planes.

In this case, two sorter cells arranged one above the other are preferably assigned to exactly two pairs of discharge planes arranged one above the other (with the distance of the sorter cells between their respective upper and lower planes), and in this way the lifting height of the sorter cells that can jointly be moved vertically is preferably equal to the vertical distance between the pairs of planes. In other words these sorter cells can, in each case, move between the level of an upper associated horizontal discharge plane and a lower associated horizontal discharge plane.

A particularly preferred, simple construction results if the discharge planes arranged one above another are vertically spaced apart equally from one another and, at the same time, the vertical distance of the sorter cells fitted one above another to the driving unit is twice as large as the vertical distance between discharge planes. Thus, for a specific number of discharge planes arranged uniformly at a distance one above another, only exactly half the number of sorter cells is needed, which can then in each case be moved between the level of a first associated discharge plane and the level of a second associated discharge plane adjacent to the first.

The discharge planes can be planes of a rack system, for example, in whose aisles the driving unit being capable of movement, e.g., along rails that, for example, are fitted under the ceiling of a room that accommodates the system. The sorter cell can have a tilt tray that is suitable for many different products for the purpose of loading, transport and discharge at the sorting destination. The sorter cell can also have a conveyor belt, in particular a transverse belt, that preferably runs horizontally, transversely to the direction of travel of the driving unit and, in this way, it picks up the products to be sorted from a loading plane, for example of a high-reach rack, past which the driving unit travels, and, following their transport, sets the products again in a discharge plane, of the rack system, for example.

The sorting apparatus preferably has at least one second driving unit with sorter cells that are permanently fitted at the level of the loading planes and/or discharge planes, arranged one above another, and cannot be moved. This saves production costs as a result of the reduced technical complexity. These driving units with fixed-level sorter cells are, however, sufficient to transport products to be sorted in which a change in level is not required, and may be used under appropriate control of a controller.

The invention will be described in the following text with reference to the appended drawings.

DETAILED DESCRIPTION

Figure 3:
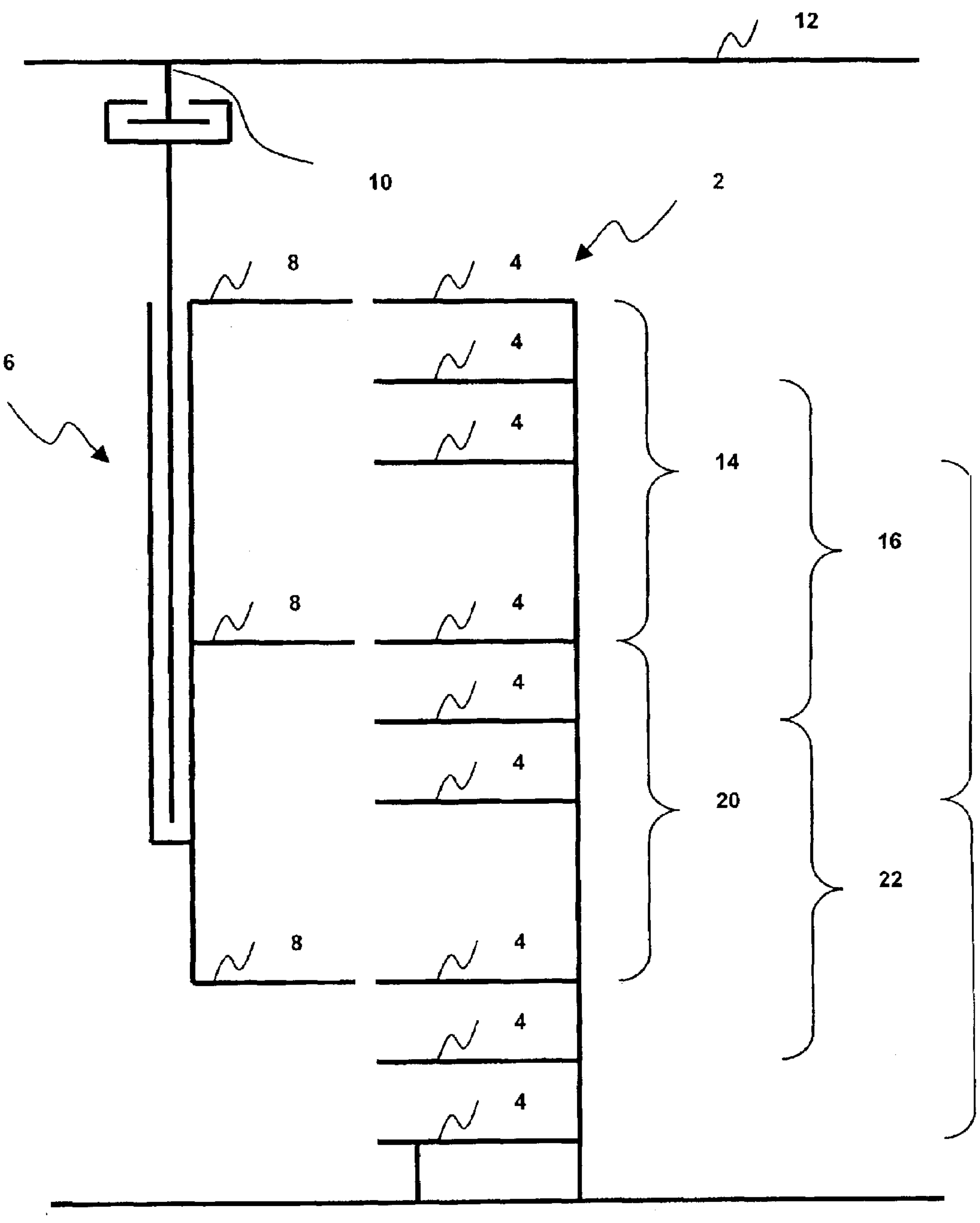
FIG. 3 shows an especially schematic side view of a further refinement of a sorting apparatus according to the invention.

FIG. 3 shows a destination system 2 having a total of nine sorting discharge planes 4. Furthermore, FIG. 3 shows a driving unit 6 on which three sorter cells 8 are arranged one above another. The driving unit 6 is fixed to a rail 10 under the roof 12 of a room such that it can be moved. The vertical distance between the upper two sorter cells 8 is equal to the vertical distance between the upper and the lower plane of a first pair 14, a second pair 16 and a third pair 18 of the discharge planes 4 arranged one above the other. The sorter cells can be moved vertically with a constant vertical distance from one another, specifically in such a way that the two upper sorter cells can be moved from the level of one pair of planes 14 to the level of one of the upper pairs of planes 16 or 18. This is correspondingly true of the two lower sorter cells and their distance from one another with respect to pairs of discharge planes 20, 22, 24 arranged further down in rack 2.

Figure 1A:
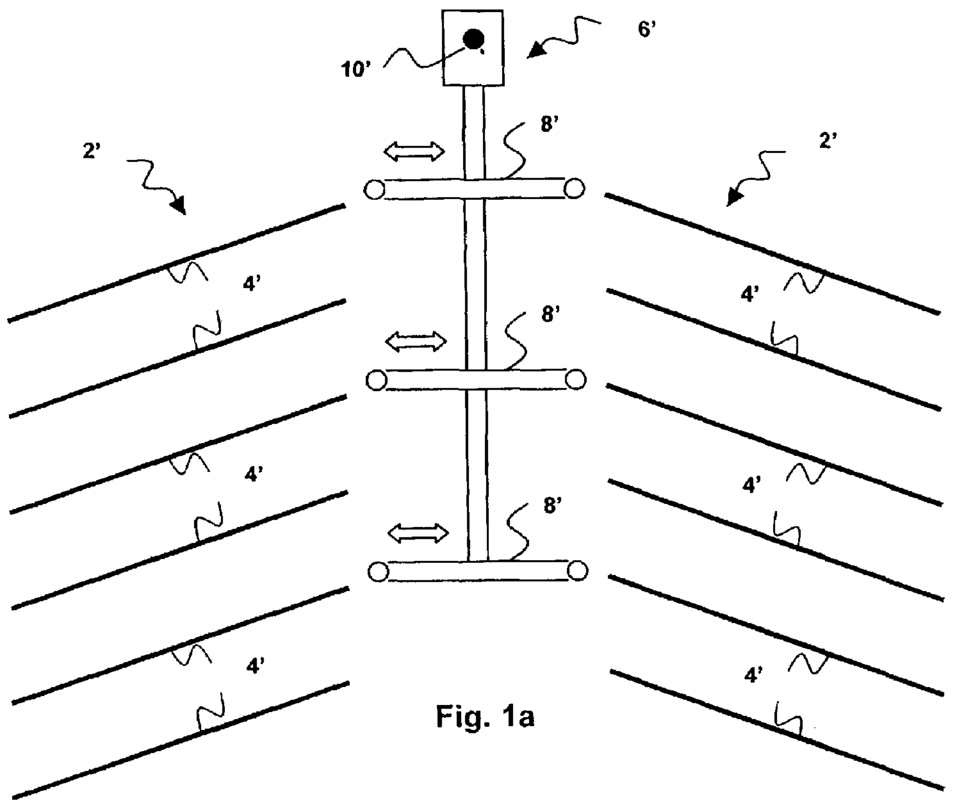
FIG. 1*a* shows a sorting apparatus according to the invention in schematic sectional view, in which, in each case, two of the sorter cells arranged one above the other are moved to the level of a pair of discharge planes.
Figure 1B:
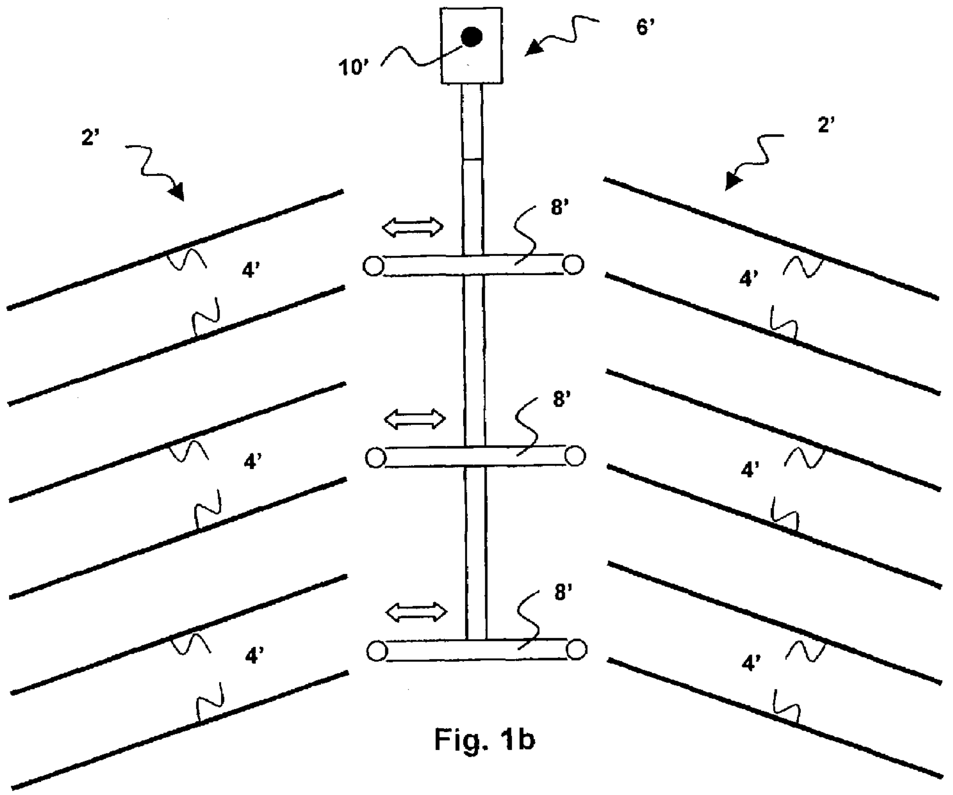
FIG. 1*b* shows the sorting apparatus according to FIG. 1*a*, in which the second sorter cells arranged one above the other have been moved to the level of a second discharge plane.

A glance at FIGS. 1*a* and *b* reveals a driving unit 6', which can likewise be moved horizontally along a rail 10'. Three sorter cells 8' in the form of transverse belts are fitted one above another at the same vertical distances from one another and, according to FIG. 1*b*, can be moved telescopically downward out of the driving unit 6'. The discharge planes 4' of a rack system 2', sloping away from the driving unit 6' and illustrated as running parallel to one another, are at the same vertical distances from one another. In this case, the vertical distances of the discharge plane 4' are half as great as the vertical distances of the sorter cells 8' from one another. Thus, the sorter cells can carry out a lifting movement at a constant vertical distance from one another in each case between the level of an upper discharge plane (position according to A) and the respective adjacent discharge plane underneath, in the position that is reached according to FIG. 1*b*. For example, programmed appropriately by a computer controller, each of the sorter cells 8' can then actuate the transverse belt to the left or right in accordance with the horizontal arrow indicated and in this way discharge the product to be sorted (not illustrated) and which has been transported on the transverse belt of the sorter cell, to the left or right as appropriate into the discharge plane 4' of the rack system 2'. The lifting movement of the sorter cells 8' between the upper position according to FIG. 1*a* and the lower position permits simplified control and kinematics for the lifting mechanism, since only a movement between an upper and a lower end position, for example against stops (not illustrated) is required, which can be configured in a constructionally simple manner, without any necessary intermediate positioning.

Figure 2:
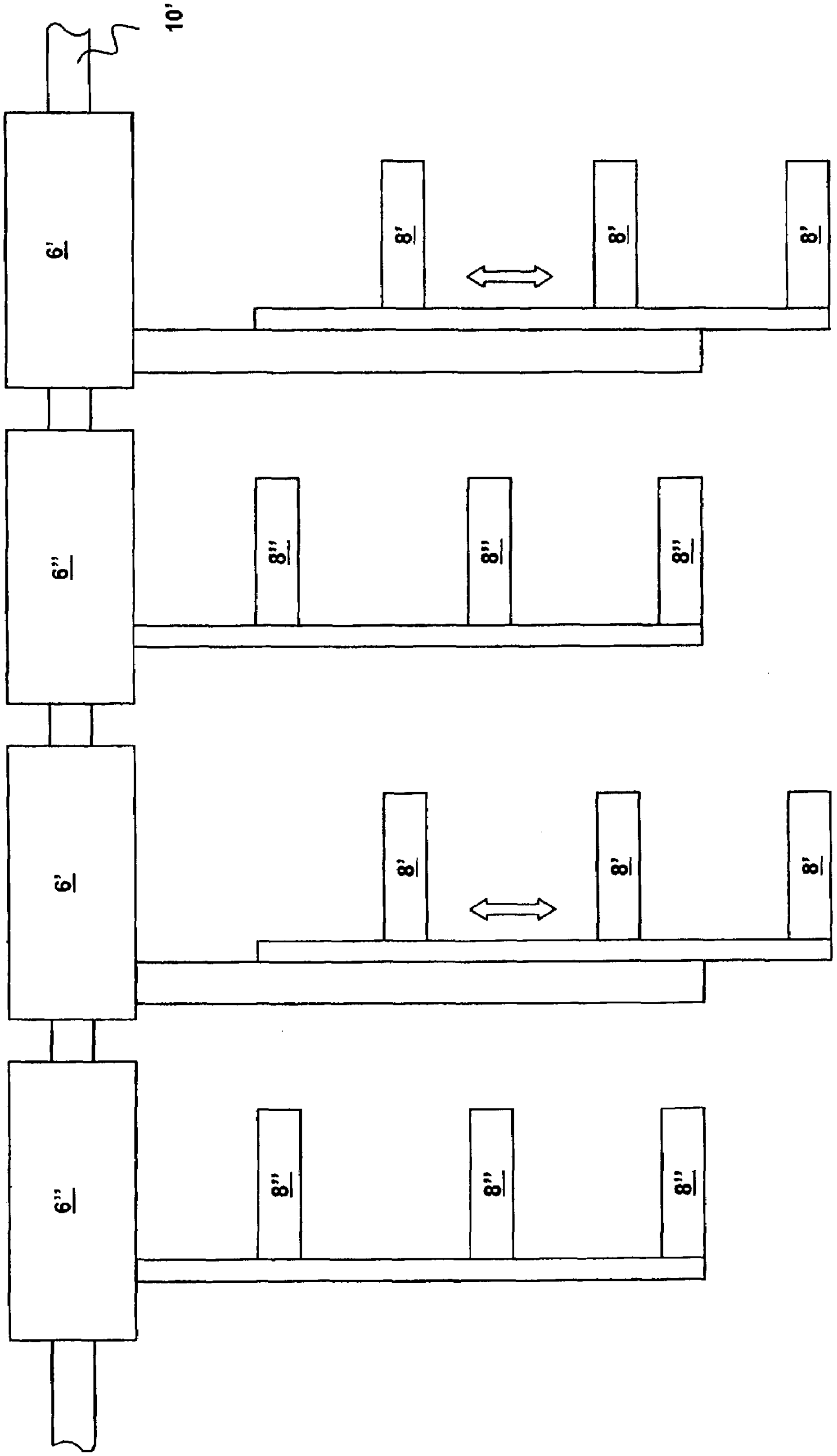
FIG. 2 shows a side view of a sorting apparatus having two driving units with vertical moveable sorter cells and two driving units with vertically fixed sorter cells in an alternating sequence in a schematic side view.

FIG. 2 reveals how four driving units 6', 6" are moved horizontally, in order, on a rail 10, each second driving unit 6" having sorter cells 8" that are fixed vertically to the driving unit 6", while the sorter cells 8' on the remaining driving units 6' can be moved vertically with a constant vertical distance from one another.

The invention claimed is:

1. A sorting apparatus, comprising:

at least two sorter cell, arranged substantially one above the other, for delivering to respective discharge planes of a plurality of such discharge planes;

the discharge planes also arranged substantially one above the other, with adjacent discharge planes being spaced from one another at a first vertical distance; and any pair of the at least two sorter cells that are adjacent one another being spaced from one another at a second vertical distance that is substantially twice the first vertical distance;

wherein the at least two sorter cells comprise a plurality of sorter cells, a first subset of the plurality of sorter cells being arranged to be movable between discharge planes, and a second subset of the plurality of sorter cells being immovably coupled at a level of respective discharge planes, the sorting apparatus further comprising a first driving unit coupled to the first subset of sorter cells that are movable between discharge planes, and a second driving unit, to which the second subset of sorter cells are immovably coupled at the level of respective discharge planes.

2. A sorting apparatus, comprising:

at least two sorter cells, arranged substantially one above the other, for delivering to respective discharge planes of a plurality of such discharge planes, wherein the sorter cells are arranged for joint vertical motions;

the discharge planes also arranged substantially one above the other, with adjacent discharge planes being spaced from one another at a first vertical distance; and any pair of the at least two sorter cells that are adjacent one another being spaced from one another at a second vertical distance that is substantially twice the first vertical distance.

wherein the at least two sorter cells comprise a plurality of sorter cells, a first subset of the plurality of sorter cells being arranged to be movable between discharge planes, and a second subset of the plurality of sorter cells being immovably coupled at a level of respective discharge planes, the sorting apparatus further comprising a first driving unit coupled to the first subset of sorter cells that are movable between discharge planes, and a second driving unit, to which the second subset of sorter cells arc immovably coupled at the level of respective discharge planes.

3. A sorting apparatus, comprising:

at least two sorter cells, arranged substantially one above the other, for delivering to respective discharge planes of a plurality of such discharge planes, wherein the sorter cells are arranged for joint vertical motion;

the discharge planes also arranged substantially one above the other, with adjacent discharge planes being spaced from one another at a first vertical distance; and any pair of the at least two sorter cells that are adjacent one another being spaced from one another at a second vertical distance that is substantially twice the first vertical distance; wherein at least one of the sorter cells comprises at least one of a tilt tray and a transverse belt;

wherein the at least two sorter cells comprise a plurality of sorter cells, a first subset of the plurality of sorter cells being arranged to be movable between discharge planes, and a second subset of the plurality of sorter cells being immovably coupled at a level of respective discharge planes, the sorting apparatus further comprising a first driving unit coupled to the first subset of sorter cells that are movable between discharge planes, and a second driving unit, to which the second subset of sorter cells are immovably coupled at the level of respective discharge planes.

4. A sorting apparatus, comprising:

at lest two sorter cells, arranged substantially one above the other for delivering to respective discharge planes of a plurality of such discharge planes, wherein the sorter cells are arranged for joint vertical motion;

the discharge planes also arranged substantially one above the other with adjacent discharge planes being spaced from one another at a first vertical distance; and any pair of the at least two sorter cells that are adjacent one another being spaced from one another at a second vertical distance that is substantially twice the first vertical distance;

wherein at least one of the discharge planes comprises at least one of a rack system and a chute system; and wherein the at least two sorter cells comprise a plurality of sorter cells, a first subset of the plurality of sorter cells being arranged to be movable between discharge planes, and a second subset of the plurality of sorter cells being immovably coupled at a level of respective discharge planes, the sorting apparatus further comprising a first driving unit coupled to the first subset of sorter cells tat are movable between discharge planes, and a second driving unit, to which the second subset of sorter cells are immovably coupled at the level of respective discharge planes.

5. A sorting apparatus, comprising:

at least two sorter cells arranged substantially one above the other, for delivering to respective discharge planes of a plurality of such discharge planes, wherein the sorter cells are arranged for joint vertical motion;

the discharge planes also arranged substantially one above the other, with adjacent discharge planes being spaced from one another at a first vertical distance; and any pair of the at least two sorter cells that are adjacent one another being spaced from one another at a second vertical distance that is substantially twice the first vertical distance; and wherein at least one of the sorter cells comprises at least one of a tilt tray and a transverse belt;

wherein at least one of the discharge planes comprises at least one of a rack system and a chute system;

wherein the at least two sorter cells comprise a plurality of sorter cells, a first subset of the plurality of sorter cells being arranged to be movable between discharge planes, and a second subset of the plurality of sorter cells being immovably coupled at a Level of respective discharge planes, the sorting apparatus further comprising a first driving unit coupled to the first subset of sorter cells that are movable between discharge planes, and a second driving unit, to which the second subset of sorter cells are immovably coupled at the level of respective discharge planes.

6. A sorting apparatus, comprising:

at least two sorter cells arranged substantially one above the other for at least one of picking up from and delivering to respective planes of a plurality of such planes, the respective planes also arranged substantially one above the other;

a lifting mechanism coupled to the at least two sorter cells for moving the sorter cells in a substantially vertical direction between first respective planes; and a driving unit coupled to the at least two sorter cells for moving the sorter cells in a substantially horizontal direction to second respective planes;

wherein the at least two sorter cells comprise a plurality of sorter cells, a first subset of the plurality of sorter cells being arranged to be movable between discharge planes, and a second subset of the plurality of sorter cells being immovably coupled at a level of respective discharge planes, the sorting apparatus further comprising a first driving unit coupled to the first subset of sorter cells that are movable between discharge planes, and a second driving unit, to which the second subset of sorter cells are immovably coupled at the level of respective discharge planes.

7. A sorting apparatus, comprising:

at least two sorter cells arranged substantially one above the other for at least one of picking up from and delivering to respective planes of a plurality of such planes, the respective planes also arranged substantially one above the other;

a lifting mechanism coupled to the at least two sorter cells for moving the sorter cells in a substantially vertical direction between first respective planes; and a driving unit coupled to the at least two sorter cells for moving the sorter cells in a substantially horizontal direction to second respective planes;

wherein the sorter cells are arranged for joint vertical motion; and wherein the at least two sorter cells comprise a plurality of sorter cells, a first subset of the plurality of sorter cells being arranged to be movable between discharge planes, and a second subset of the plurality of sorter cells being immovably coupled at a level of respective discharge planes, the sorting apparatus further comprising a first driving unit coupled to the first subset of sorter cells that can be moved between discharge planes, and a second driving unit, to which the second subset of sorter cells are immovably coupled at the level of respective discharge planes.

8. A sorting apparatus, comprising:

at least two sorter cells arranged substantially one above the other for at least one of picking up from and delivering to respective planes of a plurality of such planes, the respective planes also arranged substantially one above the other;

a lifting mechanism coupled to the at least two sorter cells for moving the sorter cells in a substantially vertical direction between first respective planes; and a driving unit coupled to the at least two sorter cells for moving the sorter cells in a substantially horizontal direction to second respective planes;

wherein at least out of the sorter cells comprises at least one of a tilt tray and a transverse belt; and wherein the at least two softer cells comprise a plurality of sorter cells, a first subset of the plurality of sorter cells being arranged to be movable between discharge planes, and a second subset of the plurality of sorter cells being immovably coupled at a level of respective discharge planes, the sorting apparatus further comprising a first driving unit coupled to the first subset of sorter cells that are movable between discharge planes, and a second driving unit, to which the second subset of sorter cells are immovably coupled at the level of respective discharge planes.

9. A sorting apparatus, comprising:

at least two sorter cells arranged substantially one above the other for at least one of picking up from and delivering to respective planes of a plurality of such planes, the respective planes also arranged substantially one above the other;

a lifting mechanism coupled to the at least two sorter cells for moving the sorter cells in a substantially vertical direction between first respective planes; and a driving unit coupled to the at least two sorter cells for moving the sorter cells in a substantially horizontal direction to second respective planes;

wherein the sorter cells are arranged for joint vertical motion;

wherein at least one of the sorter cells comprises at least one of a tilt tray and a transverse belt; and wherein the at least two sorter cells comprise a plurality of sorter cells, a first subset of the plurality of sorter cells being arranged to be movable between discharge planes, and a second subset of the plurality of sorter cells being immovably coupled at a level of respective discharge planes, the sorting apparatus further comprising a first driving unit coupled to the first subset of sorter cells that can be moved between discharge planes, and a second driving unit, to which the second subset of sorter cells are immovably coupled at the level of respective discharge planes.

10. A sorting apparatus, comprising:

at least two sorter cells arranged substantially one above the other for at least one of picking up from and delivering to respective planes of a plurality of such planes, the respective planes also arranged substantially one above the other;

a lifting mechanism coupled to the at least two sorter cells for moving the sorter cells in a substantially vertical direction between first respective planes; and a driving unit coupled to the at least two sorter cells for moving the sorter cells in a substantially horizontal direction to second respective planes;

wherein at least one of the discharge planes comprises at least one of a rack system and a chute system; and wherein the at least two sorter cells comprise a plurality of sorter cells, a first subset of the plurality of sorter cells being arranged to be movable between discharge planes, a second subset of the plurality of sorter cells being immovably coupled at a level of respective discharge planes, the sorting apparatus further comprising a first driving unit coupled to the first subset of sorter cells that are movable between discharge planes, and a second driving unit, to which the second subset of sorter cells are immovably coupled at the level of respective discharge planes.

11. A sorting apparatus, comprising:

at least two sorter cells arranged substantially one above the other for at least one of picking up from and delivering to respective planes of a plurality of such planes, the respective planes also arranged substantially one above the other;

a lifting mechanism coupled to the at least two sorter cells for moving the sorter cells in a substantially vertical direction between first respective planes; and a driving unit coupled to the at least two sorter cells for moving the sorter cells in a substantially horizontal direction to second respective planes;

wherein the sorter cells are arranged for joint vertical motion;

wherein at least one of the discharge planes comprises at least one of a rack system and a chute system; and wherein the at least two sorter cells comprise a plurality of sorter cells, a first subset of the plurality of sorter cells being arranged to be movable between discharge planes, and a second subset of the plurality of sorter cells being immovably coupled at a level of respective discharge planes, the sorting apparatus further comprising a first driving unit coupled to the first subset of sorter cells that can be moved between discharge planes, and a second driving unit, to which the second subset of sorter cells are immovably coupled at the level of respective discharge planes.

12. A sorting apparatus; comprising:

at least two sorter cell arranged substantially one above the other for at least one of picking up from and delivering to respective planes of a plurality of such planes, the respective planes also arranged substantially one above the other;

a lifting mechanism coupled to the at least two sorter cells for moving the sorter cells in a substantially vertical direction between first respective planes; and a driving unit coupled to the at least two sorter cells for moving the sorter cells in a substantially horizontal direction to second respective planes;

wherein at least one of the sorter cells comprises at least one of a tilt tray and a transverse belt;

wherein at least one of the discharge planes comprises at least one of a rack system and a chute system; and wherein the at least two sorter cells comprise a plurality of sorter cells, a first subset of the plurality of sorter cells being arranged to be movable between discharge planes, and a second subset of the plurality of sorter cells being immovably coupled at a level of respective discharge planes, the sorting apparatus further comprising a first driving unit coupled to the first subset of sorter cells that are movable between discharge planes, and a second driving unit, to which the second subset of sorter cells are immovably coupled at the level of respective discharge planes.

13. A sorting apparatus, comprising:

at least two sorter cells arranged substantially one above the other for at least one of picking up from and delivering to respective planes of a plurality of such planes, the respective planes also arranged substantially one above the other;

a lifting mechanism coupled to the at least two sorter cells for moving the sorter cells in a substantially vertical direction between first respective planes; and a driving unit coupled to the at least two sorter cells for moving the sorter cells in a substantially horizontal direction to second respective planes;

wherein the sorter cells are arranged for joint vertical motion;

wherein at least one of the sorter cells comprises at least one of a tilt tray and a transverse belt;

wherein at least one of the discharge planes comprises at least one of a rack system and a chute system, and wherein the at least two sorter cells comprise a plurality of sorter cells, a first subset of the plurality of sorter cells being arranged to be movable between discharge planes, and a second subset of the plurality of sorter cells being immovably coupled at a level of respective discharge planes, the sorting apparatus further comprising a first driving unit coupled to the first subset of sorter cells that can be moved between discharge planes, and a second driving wilt, to which the second subset of sorter cells are immovably coupled at the level of respective discharge planes.

* * * * *

UNITED STATES PATENT AND TRADEMARK OFFICE

CERTIFICATE OF CORRECTION

PATENT NO. : 7,249,678 B2
APPLICATION NO. : 10/365974
DATED : July 31, 2007
INVENTOR(S) : Jürgen Schieleit It is certified that error appears in the above-identified patent and that said Letters Patent is hereby corrected as shown below:

Col. 4
Line 9: "cell" should read --cells--.
Line 34: "motions" should read --motion--.
Line 41: "distance." should read --distance,--.

Col. 5
Line 31: "tat" should read --that--.
Line 55: "Level" should read --level--.

Col. 6
Line 55: "out" should read --one--.

Col. 8
Line 11: "cell" should read --cells--.
Line 63: "wilt" should read --unit--.

Signed and Sealed this

Thirtieth Day of October, 2007

JON W. DUDAS
*Director of the United States Patent and Trademark Office*